Patented Jan. 6, 1931

1,788,149

UNITED STATES PATENT OFFICE

PETER M. CONTANT, OF NEW YORK, N. Y., ASSIGNOR TO NECKAR WATER SOFTENER CORPORATION, OF NEW YORK, N. Y., A CORPORATION OF NEW YORK

BOILER FEED-WATER TREATMENT

Application filed October 11, 1928. Serial No. 311,789.

The present invention relates to processes for treating boiler feed water to prevent and to check embrittlement of boiler materials.

Feed waters containing sodium bicarbonate produce a strongly alkaline condition in the boilers upon concentration through evaporation, the high temperatures driving off carbon dioxide and thereby reducing the bicarbonate to normal carbonate. The normal carbonate is then partially split up within the boiler into sodium hydroxide. The formed sodium hydroxide, in the absence of a sufficient amount of sodium sulphate in the boiler water, has a very detrimental effect on the structural material of the steam boiler.

It is an object of the present invention to prevent such detrimental effect by increasing the amount of sodium sulphate and decreasing the amount of sodium carbonate in the boiler feed water through proper treatment.

Figure 1:
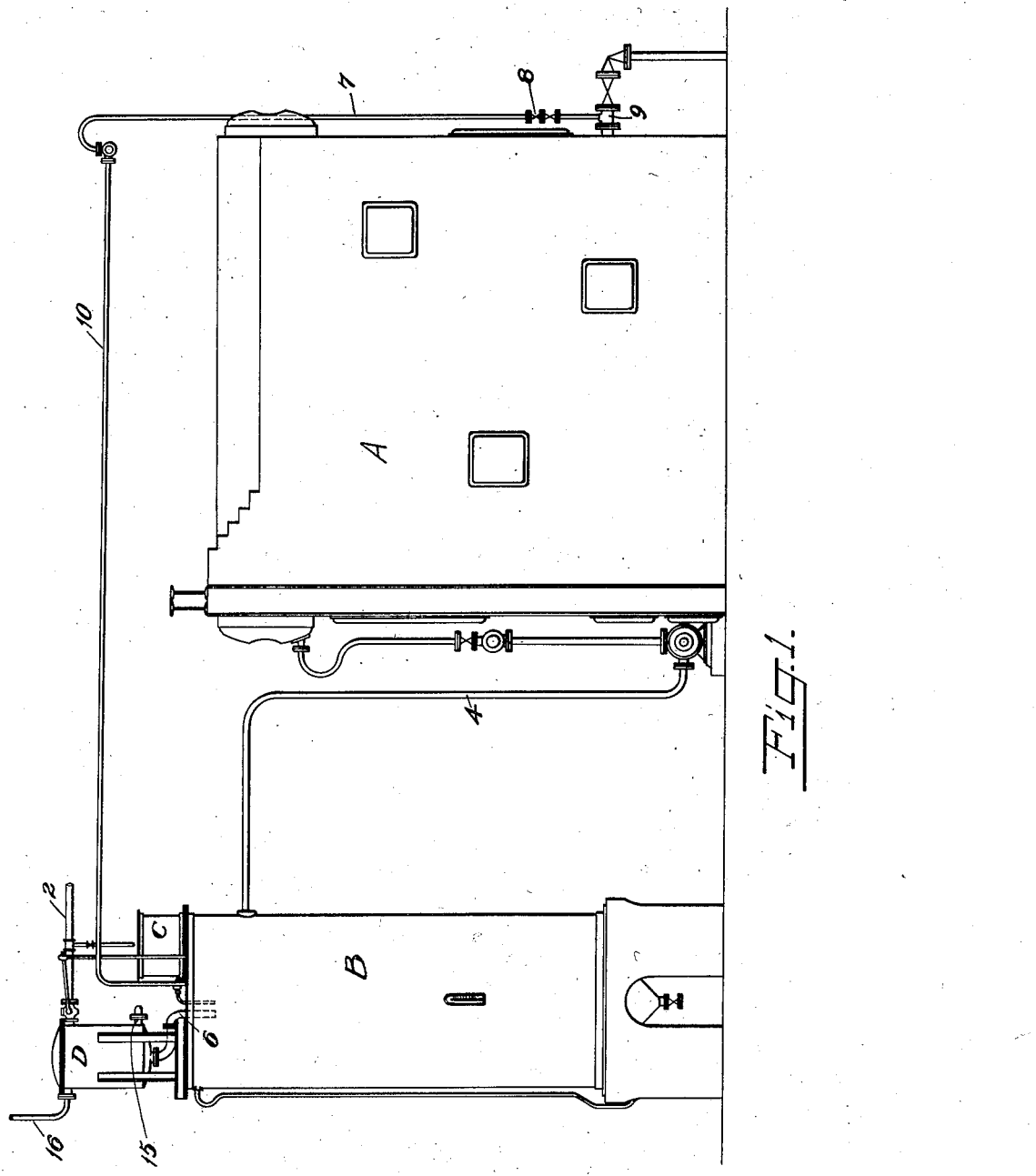
Figure 2:
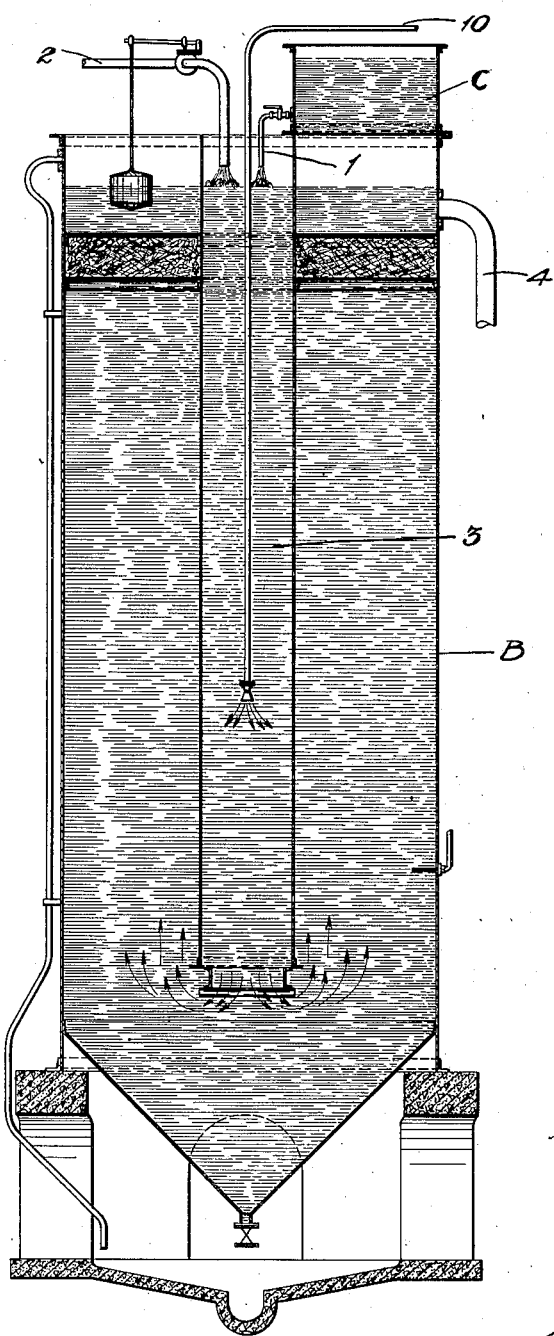

Further objects and advantages will be apparent in the following detailed description taken in conjunction with the accompanying drawings, wherein:

Fig. 1 is an elevation of a typical installation comprising a boiler, feed pump, and treatment tank, and Fig. 2 is a sectional elevation of the treatment tank showing details of construction and arrangement.

In the figures, the boiler A receives treated feed water from the treatment tank B through the feed conduit 4 and the boiler feed pump. A continuous return from the boiler A, or from each boiler, in a battery of boilers, is led from the blow-off pipe 9 through valve controlled pipe 7, equipped with sampling cock 8, into the return pipe 10 which discharges directly into the treatment tank B within a central reaction chamber 3. The hot boiler return heats and reacts with the mixture of descending untreated make-up water received through pipe 2 and the ferrous sulphate solution supplied from chemical tank C through the valve-controlled drip feeder 1. The untreated make-up water may, if desired, first pass through a preheater D having a steam inlet 15, a vent 16 and a conduit 6 leading into the treatment tank B.

Within the reaction chamber 3 the sodium bicarbonate present in the raw water, the sodium hydroxide present in the boiler return, and the ferrous sulphate fed from the chemical tank, react to form sodium sulphate and insoluble ferrous carbonate, and the sodium carbonate present in the boiler return water also reacts with the ferrous sulphate to also form sodium sulphate and insoluble ferrous carbonate, in accordance with the following equations:

$$NaHCO_3 + NaOH + FeSO_4 = Na_2SO_4 + FeCO_3 + H_2O$$
$$Na_2CO_3 + FeSO_4 = Na_2SO_4 + FeCO_3$$

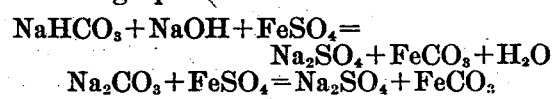

In other words, by supplying one molecule of ferrous sulphate for any two molecules of sodium bicarbonate in the make-up water (potentially equivalent to one molecule of sodium carbonate in the boiler), one molecule of sodium sulphate is formed, and a similar conversion is brought about in the reaction of the ferrous sulphate with the sodium carbonate in the boiler return. Since the ferrous carbonate is insoluble, the result of the reaction does not change the number of molecules of soluble salts in the feed water. It is desirable to keep the dissolved solids in the feed water as low as possible in order to avoid high concentrations within the boilers.

A positive reaction of the ferrous sulphate on the sodium bicarbonate in the make-up water depends on the conversion of the sodium bicarbonate by the sodium hydroxide into normal carbonate. If the reaction is not completed, however, the sodium carbonate is returned from the boiler as normal carbonate, under the influence of the boiler conditions; and the process therefore affords a simple means for establishing any desired predetermined ratio between sodium carbonate and sodium sulphate in the boiler water.

Thus, assuming a make-up water having the following composition, expressed in parts per million:

| | |
|---|---|
| Ca | 57 |
| Mg | 26 |
| Na | 32 |
| Cl | 2 |
| $HCO_3$ | 365 |
| $SO_4$ | 5 | the boiler water will show a ratio of sodium sulphate to soda (methyl orange) alkalinity of 7.4 to 65.3 if no treatment should be applied. If it is desired to change this ratio to the proportion 3.5 to 1, sufficient ferrous sulphate is added to the water to convert 46.0 p. p. m. of sodium carbonate into sodium sulphate, thereby creating 46x142/106 or 61.6 p. p. m. of sodium sulphate.

I claim:

1. A method of treating boiler feed water containing sodium bicarbonate, comprising subjecting the sodium bicarbonate to heat to form sodium carbonate and sodium hydroxide, and reacting the formed sodium carbonate and sodium hydroxide and additional sodium bicarbonate with ferrous sulphate to form sodium sulphate and ferrous carbonate.

2. A method of treating boiler feed water containing sodium bicarbonate, comprising treating the sodium bicarbonate to form sodium carbonate and sodium hydroxide, and reacting the formed sodium carbonate and sodium hydroxide and additional sodium bicarbonate with ferrous sulphate to form sodium sulphate and ferrous carbonate.

3. A method of treating boiler feed water containing sodium bicarbonate, comprising subjecting water containing sodium bicarbonate to heat to form sodium carbonate and sodium hydroxide, and adding the formed sodium carbonate and sodium hydroxide together with regulated quantities of ferrous sulphate to the feed water to establish a desired ratio of sodium sulphate to sodium hydroxide in the boiler.

4. A method of treating boiler feed water containing sodium bicarbonate, comprising subjecting water containing sodium bicarbonate to heat to form sodium carbonate and sodium hydroxide, and adding the formed sodium carbonate and sodium hydroxide together with regulated quantities of ferrous sulphate to the feed water to establish a desired ratio of sodium sulphate to soda alkalinity in the boiler.

5. A method of controlling the composition of boiler water when using feed water containing sodium bicarbonate, comprising subjecting feed water to the heat of the boiler to form sodium carbonate and sodium hydroxide, and treating additional feed water containing sodium bicarbonate with the formed sodium carbonate and sodium hydroxide and also with ferrous sulphate to form sodium sulphate and ferrous carbonate.

6. A method of controlling the composition of boiler water when using feed water containing sodium bicarbonate, comprising feeding the bicarbonate-containing water to the boiler, subjecting the bicarbonate-containing water to the heat of the boiler to form sodium carbonate and sodium hydroxide, continuously blowing-off boiler water containing sodium carbonate and sodium hydroxide, and reacting the blow-off water with additional feed water containing sodium bicarbonate and with ferrous sulphate to form sodium sulphate and ferrous carbonate.

In testimony whereof I affix my signature.

PETER M. CONTANT.